March 15, 1966  W. ROTH  3,240,054
ICE DETECTOR
Filed Dec. 24, 1962
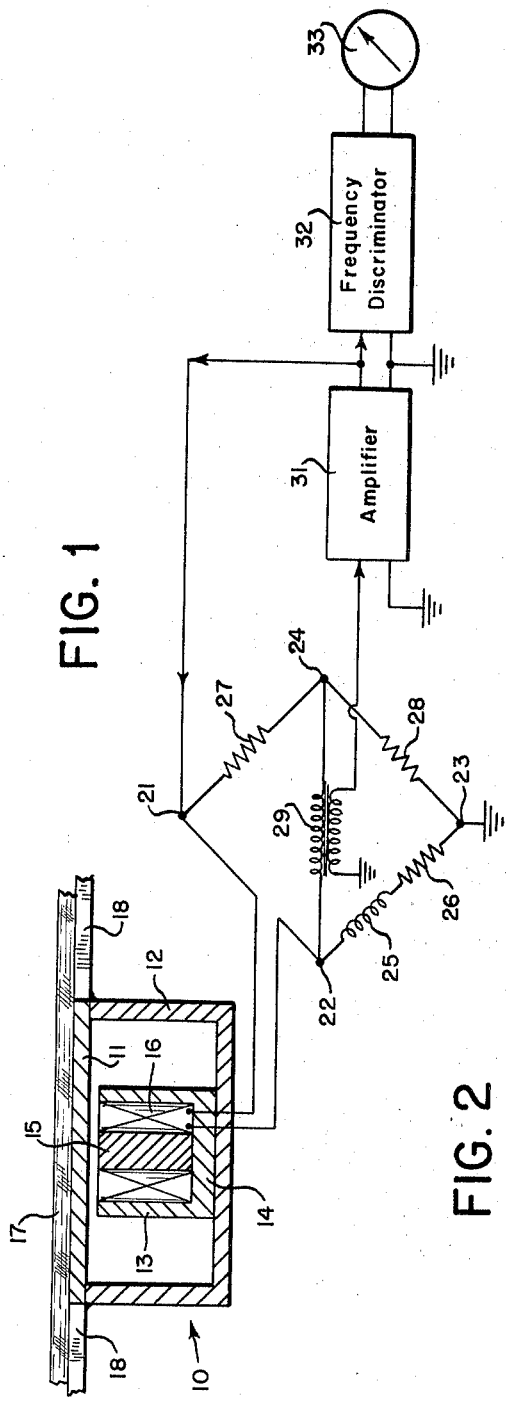
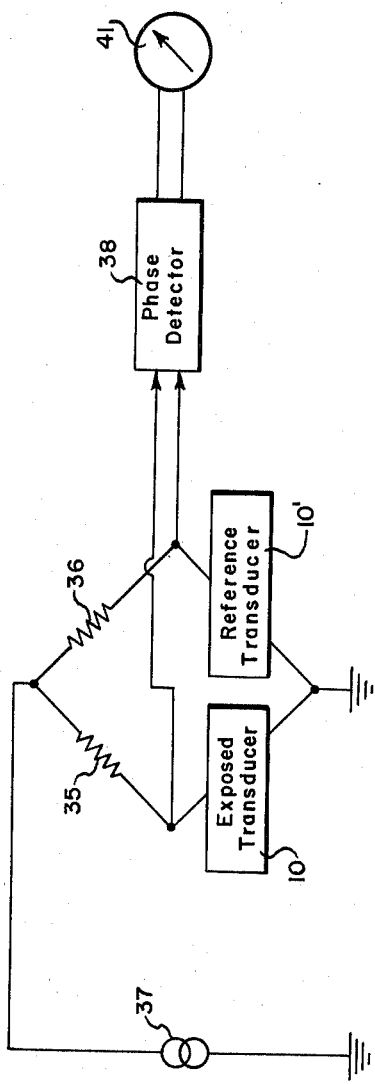
INVENTOR
Wilfred Roth
BY
ATTORNEYS 3,240,054
ICE DETECTOR
Wilfred Roth, West Hartford, Conn., assignor to Gabb Special Products, Inc., Windsor Locks, Conn., a corporation of Connecticut
Filed Dec. 24, 1962, Ser. No. 246,731
5 Claims. (Cl. 73—67.1)

This invention relates particularly to means for detecting the accretion of ice on a surface, but is also applicable to the detection of accretions of other materials possessing sufficient stiffness.

There are many uses for a sensitive ice detector, particularly if it is rugged, simple to install and use, and not excessively expensive. Among these uses are the detection of the formation of ice on an aircraft, on inlets to jet engines, on highways, the detection of excessive buildup of ice in commercial freezers, etc.

There have heretofore been proposed ice detectors employing an oscillating element such as a diaphragm, torsion tube, etc. Some of the proposed detectors function by virtue of the change in amplitude of oscillation of the element due to an increase in damping or an increase in the radiation resistance caused by the accretion of ice thereon. It has also been proposed to measure the change in resonant frequency of the oscillating element caused by the mass of an accreted layer of ice.

In use, ice detectors may be exposed to buildup of grease, water, dirt, etc. Such a buildup may also affect the amplitude or frequency of an oscillating element, and hence give rise to an erroneous indication depending on the exact manner in which the ice detector functions.

The present invention makes use of the stiffness of an accreted layer of ice, rather than the mass thereof. In accordance with the invention, an elastically vibratory member is employed having an elastically vibratory resonant frequency determined in substantial part by the stiffness of the member. The member is exposed to the accretion of ice thereon so that the stiffness of an accreted layer of ice increases its resonant frequency. Means are then provided for determining an increase in the resonant frequency or, in general, changes in the resonant frequency and the direction thereof. In this manner the buildup of a layer of ice can be separated from a buildup of grease, water, dirt, etc. which have little stiffness and contribute primarily to the mass of the vibrating element, hence lowering its resonant frequency.

The elastically vibratory member may take various forms. A flexurally resonant diaphragm clamped at its periphery is presently preferred, and is arranged in a transducer so that the flexural stiffness and the mass of the diaphragm are the primary factors determining its resonant frequency. Flexurally vibrating strips, torsionally resonant rods or tubes, etc. may also be employed if desired, with suitable actuating means such as electromagnetic, piezoelectric, magnetostrictive, etc. elements for producing and responding to motion thereof.

The resonant frequency of an elastically vibrating member depends upon the ratio of stiffness to mass. For high sensitivity, the transducer is preferably designed so that the stiffness is largely that of the member on which the layer of ice forms. However, it is possible to have some of the stiffness contributed by another element or elements, so long as the stiffness of an accreted layer of ice substantially changes the resonant frequency. The mass involved in determining the initial resonant frequency may be largely that of the elastically vibrating member itself, or the mass of another element or elements may contribute to the total mass.

Various circuits may be employed in order to determine the change in resonant frequency due to an accreted layer of ice. Thus the transducer may be arranged in a feedback oscillator circuit and the change in oscillating frequency indicated. Or, the transducer may be driven at a constant frequency near its resonant frequency and the change in phase relative to a reference transducer measured. Other circuits known in the electronic art may be employed if desired.

While the invention is particularly designed and adapted for detecting the formation of an ice layer, and has important advantages for such use, it is also possible to use it to detect or measure accreted layers of other materials having sufficient stiffness to increase the resonant frequency of the elastically vibratory member.

The invention will be described more fully in connection with specific embodiments thereof illustrated in the accompanying drawings, in which:

FIG. 1 shows one form of transducer in a self-oscillating indicating circuit; and FIG. 2 illustrates another type of indicating circuit employing a reference transducer.

Referring to FIG. 1, a transducer generally designated as 10 is shown employing a flexurally resonant diaphragm and electromagnetic actuating means. Diaphragm 11 of magnetic material is affixed at its periphery to a housing 12 of nonmagnetic material. The diaphragm may have various shapes, a circular diaphragm being here shown. Within housing 12 is an electromagnetic structure comprising a cylindrical pole 13, a circular bottom portion 14, and a centrally disposed permanent magnet core 15. Coil 16 encircles core 15. When the coil is supplied with alternating current, an alternating flux flows between the inner core 15 and the outer pole 13, passing largely through the adjacent area of diaphragm 11, and consequently causes the diaphragm 11 to oscillate. The permanent magnet supplies D.-C. bias flux through the diaphragm 11 so that, although the flux is increased and decreased by the A.-C. flux, the direction of the flux never reverses. This avoids frequency doubling, etc. and provides a structure wherein the forces on the diaphragm are approximately linear.

With the structure shown, the diaphragm has a natural flexurally resonant frequency determined primarily by the flexural stiffness and the mass thereof. The fundamental resonant frequency of the diaphragm may be expressed as:

$$f_r = K\left(\frac{h}{a^2}\right)\left[\frac{Q}{\rho(1-s)^2}\right]^{1/2} \qquad (1)$$

where $f_r$ = resonant frequency
$K$ = a constant
$h$ = half-thickness of the diaphragm
$a$ = radius of the diaphragm
$Q$ = modulus of elasticity
$\rho$ = density
$s$ = Poisson's coefficient.

In this equation the dimensions and elastic properties of the diaphragm which determine its stiffness are separately stated, to facilitate analysis. The dimensions and density also determine its effective mass. It will be noted that, for a given diameter, the resonant frequency increases directly with the thickness, increases as the square root of the modulus of elasticity, and decreases as the square root of the density.

In FIG. 1 an accreted layer of ice is indicated at 17. The layer of ice will have both stiffness and mass. Since it firmly adheres to the surface of diaphragm 11, it will change the resonant frequency thereof. While Equation 1 is not strictly appreciable to a composite diaphragm, it suffices to indicate the general nature of the effect of an accreted layer of ice. If ice had exactly the same elastic properties and density as that of the diaphragm material, $h$ would increase, whereas Q and $\rho$ would remain constant. Thus, if the layer of ice had a thickness equal to the original thickness of the diaphragm, the resonant frequency would be doubled. Actually, ice will normally not have the same elastic properties and the density as that of the diaphragm. The density of ice is very much less than that of steel, for example, about one-eighth as dense, but the elastic properties are not very different. Thus the effective density would be somewhat lower, tending also to increase the resonant frequency.

The differences between the density and elastic properties of the layer of ice and the diaphragm will vary with the diaphragm material. However, materials may readily be selected such that the increased stiffness of the composite diaphragm due to the accretion of ice predominates over the increased mass thereof.

Deposits of water, snow, grease, dirt, and the like which have mass but little or no stiffness, will increase the effective mass of diaphragm 11. Equation 1 will not apply since that assumes that the material having a density $\rho$ also has a modulus of elasticity Q. However, general considerations of mechanical resonance make it clear that an increase in the effective mass of the diaphragm, without an increase in stiffness, will lower the resonant frequency.

Many different forms of transducers employing different types of vibrating members may be used, as mentioned above. The equation relating stiffness and mass to resonant frequency will depend on the type of member and will differ from Equation 1, but the same type of relationships will exist.

In FIG. 1, the coil 16 of transducer 10 forms one arm of a bridge circuit. Inductance 25 and resistor 26 are connected in a second arm. The values of the inductance and resistance may be selected to simulate the blocked impedance of the transducer, that is, the impedance of coil 16 with the diaphragm blocked. The other two arms of the bridge are formed by resistors 27 and 28 selected to balance the bridge under blocked conditions. The primary of transformer 29 is connected across one diagonal, and the secondary connected to the input of amplifier 31. The output of the amplifier is connected across the other diagonal of the bridge, between points 21 and 23. This constitutes a feedback oscillator with the transducer 10 included in the feedback path.

Assuming that the diaphragm is oscillating, the back E.M.F. of the transducer appears across diagonal 22–24 of the bridge, and this voltage appears across the secondary of transformer 29 and is amplified in amplifier 31. The output of the amplifier is supplied across the other diagonal, and hence supplies driving current for the transducer. The phase relationships are selected so that regeneration occurs. In consequence, the diaphragm 11 oscillates at its flexurally resonant frequency in the absence of an accreted layer of ice. When ice forms thereon, the resonant frequency changes, thus changing the frequency of regenerative oscillation.

Means for determining the change in frequency are provided, and is here shown as a frequency discriminator 32 of known type which produces an indication on meter 33. The frequency discriminator may be designed to yield no output at the normal resonant frequency of transducer 10, and outputs of opposite polarity for higher and lower frequencies. Then meter 33 can be a zero center meter with an upward deflection indicating increased frequency and a downward deflection indicating decreased frequency. Thus, the accretion of a layer of ice can be distinguished from other deposits on the diaphragm 11 which have mass but no stiffness. If desired, a relay actuating an alarm could be used in place of or in conjunction with meter 33, and set to close when the discriminator output exceeds a value corresponding to a given thickness of ice.

By employing a transducer having a diaphragm of sufficiently low stiffness so that the stiffness of an accreted layer of ice predominates, the resultant change in frequency can be quite considerable. For example, in one embodiment using a hearing aid transducer having the general structure shown in FIG. 1, the normal resonant frequency was about 1000 cycles. Increases up to several thousand cycles were noted as the accreted layer of ice built up.

The circuit shown in FIG. 1 is relatively simple and has been found useful for the purpose. However, other self-oscillating circuits in which the resonant frequency of the transducer determines the frequency of oscillation may be employed if desired, as well as other detailed circuitry for determining changes in the oscillation frequency and the direction thereof.

Referring now to FIG. 2, transducer 10 is the transducer exposed to the accretion of ice, and reference transducer 10′ is a similar transducer but protected from the accretion of ice. The coils of these transducers form two arms of a bridge, with resistors 35 and 36 forming the other two arms. An alternating current generator 37 is connected across one diagonal of the bridge to drive the two transducers at the same frequency. The frequency of generator 37, and the natural resonant frequencies of the transducers, are selected with respect to each other so that the transducers, in the absence of an accreted layer of ice on 10, are driven in the region of their resonant frequency.

When the resonant frequency of the exposed transducer 10 changes, its phase with respect to reference transducer 10′ will shift. The shift will be in one direction for ice loading and in the opposite direction for water, grease and the like which lack stiffness. A phase detector 38 is connected across the other diagonal of the bridge so as to determine the magnitude and direction of the phase shift. The output of the phase detector is connected to meter 41 for indication. The phase detector may be of any suitable type known in the art. Preferably a phase detector insensitive to amplitude variations is employed, or limiting introduced, since the bridge output will change in amplitude as well as in phase as the resonant frequency of transducer 10 changes with respect to the drive frequency of generator 37.

Instead of using an actual reference transducer for 10′, an equivalent electrical circuit could be employed. However, by arranging the reference transducer to be subject to the same environmental conditions as transducer 10, except for protecting it from the accretion of ice, variations in the resonant frequencies of the transducers due to factors other than ice loading may be compensated.

Other circuits for determining the phase shift of the exposed transducer may be employed if desired. For example, the reference transducer could be eliminated and the phase shift of the exposed transducer with respect to the applied frequency determined.

When the exposed transducer is used in a self-oscillating circuit, as in FIG. 1, the frequency of oscillation is substantially the resonant frequency of the transducer and hence changes as the accreted layer of ice builds up. On the other hand, when the transducer is driven from a fixed frequency source, as in FIG. 2, the frequency of oscillation of the transducer remains the same as the layer of ice builds up, but the transducer resonant frequency changes. The transducer has a resonant characteristic, which is customarily represented by a curve showing the variation in its amplitude of oscillation with frequency on both side of its resonant frequency. When the drive frequency coincides with the resonant frequency the oscillation is in phase with the drive frequency, but as coincidence is departed from, the phase changes. As the transducer resonant frequency changes, its resonant characteristic shifts with respect to the drive frequency. This causes both the amplitude and phase of the transducer oscillation to change with respect to the drive frequency.

Near the resonant frequency the amplitude of oscillation changes slowly, whereas the phase changes rapidly. Farther away, but still within the resonant region, the amplitude changes more rapidly and the phase more slowly. As the drive frequency moves outside of the resonant region, little change in amplitude and phase occur. In general, the drive frequency should be selected to lie in the region of the resonant frequency of the transducer, so that a significant change in phase is obtained as ice builds up. With the drive frequency at or near the resonant frequency in the absence of ice, the rapid changes in phase as the layer of ice forms promotes sensitivity to initial accretions of ice. However, the drive frequency could be located down on a skirt of the unloaded resonant characteristic if desired, although some decrease in sensitivity to initial accretions may result. The loss in sensitivity may not be serious if the drive frequency is somewhat above the unloaded resonant frequency, that is, on the upper skirt of the unloaded resonant characteristic, since then the increase in resonant frequency due to an ice layer will move the peak of the resonant characteristic toward the drive frequency. Thus the sensitivity will increase as the ice layer builds up until the resonant frequency equals to drive frequency, and may be desirable in some applications.

The transducer may be mounted in various manners, depending upon its use. In general it will be mounted so that its diaphragm or other elastically vibratory member is subject to the same icing conditions as the surface of interest. If the surface of interest is a thin sheet, it may be used as a diaphragm or part thereof.

In FIG. 1 it is assumed that it is desired to know when ice is forming on an exposed surface such as the wing of an airplane, and the transducer is mounted so that its diaphragm is flush with the exposed surface of the skin, indicated at 18. Alternatively, the transducer could be mounted inside the wing, with the diaphragm bonded to the under side of the skin 18, so that the thin skin forms part of the diaphragm.

If the surface of interest is a sheet of magnetic material, the transducer of FIG. 1 could be arranged to use a portion of the sheet as the diaphragm. If of non-magnetic material, it could still be used as the diaphragm and a different type of actuating mechanism employed. These and other modifications may be made, as will be understood by those skilled in the art, to suit the requirements of a given application.

The apparatus described above is particularly designed for the detection of an accreted layer of ice, and has the important advantage of being able to distinguish a layer of ice from materials having little or no stiffness. However, it may also be used to detect or measure accreted layers of other materials which have sufficient stiffness to increase the resonant frequency of the elastically vibratory member. As an accreted layer of such a material builds up, the resonant frequency will increase and indicate its presence. If the stiffness of the material is constant, the increase in frequency will be a measure of its thickness. If the thickness is known, or is constant, the increase in frequency will be a measure of its stiffness.

In the specific embodiments described, the elastically vibratory member forms part of an electro-mechanical transducer and the transducer is supplied with an alternating electric current to produce oscillation thereof. Driving means other than electrical may be employed if desired, such as acoustical or mechanical. An example of an acoustical drive would be to expose the diaphragm to acoustic pressure fluctuations. An example of a mechanical drive would be to subject the housing to mechanical vibration. Such drives may be useful in applications where a suitable acoustic or mechanical environment exists. Usually it will be more convenient to determine changes in the resonant frequency by electronic means, so that an electro-mechanical transducer such as that shown in the specific embodiments may still be employed.

I claim:
1. An ice detector which comprises
   (a) a transducer including an elastically vibratory resonant member having an elastically vibratory resonant frequency determined in substantial part by the stiffness thereof,
   (b) said member being exposed to the accretion of ice thereon whereby the stiffness of an accreted layer of ice increases said resonant frequency of the member,
   (c) a second reference transducer similar to the first-mentioned transducer and protected from the accretion of ice on the elastically vibratory member thereof,
   (d) means for energizing said transducers from a common source of alternating current in the region of the elastically vibratory resonant frequency thereof,
   (e) the accretion of ice on the exposed transducer shifting the resonant characteristic thereof with respect to the frequency of said alternating current source,
   (f) and means for determining changes in the relative phase of said transducers and the direction thereof.

2. Apparatus for the detection of an accreted layer of a material possessing substantial stiffness which comprises
   (a) a transducer including an elastically vibratory member and having a resonant frequency determined in substantial part by the stiffness of said member,
   (b) said member being exposed to the accretion of a layer of said material thereon whereby the stiffness of an accreted layer increases said resonant frequency of the transducer,
   (c) means for energizing said transducer from an independent alternating current source having a frequency in the region of said resonant frequency of the transducer but substantially independent thereof,
   (d) the accretion of said layer shifting the resonant characteristic of the transducer with respect to the frequency of said alternating current source,
   (e) and a phase detector responsive to the output signal of said transducer for yielding an indication varying with changes in phase thereof.

3. Apparatus in accordance with claim 2 in which said phase detector is insensitive to variations in amplitude of the signal supplied thereto.

4. Apparatus in accordance with claim 2 including a limiter in circuit with said phase detector for rendering the phase detector insensitive to variations in amplitude of the signal supplied thereto.

5. An ice detector which comprises
   (a) a transducer including an elastically vibratory resonant member and having a resonant frequency determined in substantial part by the stiffness of said member,
   (b) said member being exposed to the accretion of ice thereon whereby the stiffness of an accreted layer of ice increases said resonant frequency of the transducer, (c) means for energizing said transducer from an independent alternating current source having a frequency in the region of said resonant frequency of the transducer but substantially independent thereof,
(d) the accretion of ice on said transducer shifting the resonant characteristics thereof with respect to the frequency of said alternating current source,
(e) and phase detector means insensitive to the amplitude variations of the signal applied thereto connected to respond to the output signal of said transducer and yield an indication varying with changes in phase thereof.

References Cited by the Examiner

UNITED STATES PATENTS

| | | | |
|---|---|---|---|
| 2,355,194 | 8/1944 | Wiggins | 73—67.1 |
| 2,800,647 | 7/1957 | Baerwald et al. | 340—234 |

FOREIGN PATENTS 775,013   5/1957   Great Britain.

RICHARD C. QUEISSER, *Primary Examiner.*

DAVID SCHONBERG, ROBERT L. EVANS,
*Examiners.*